Figure 1:
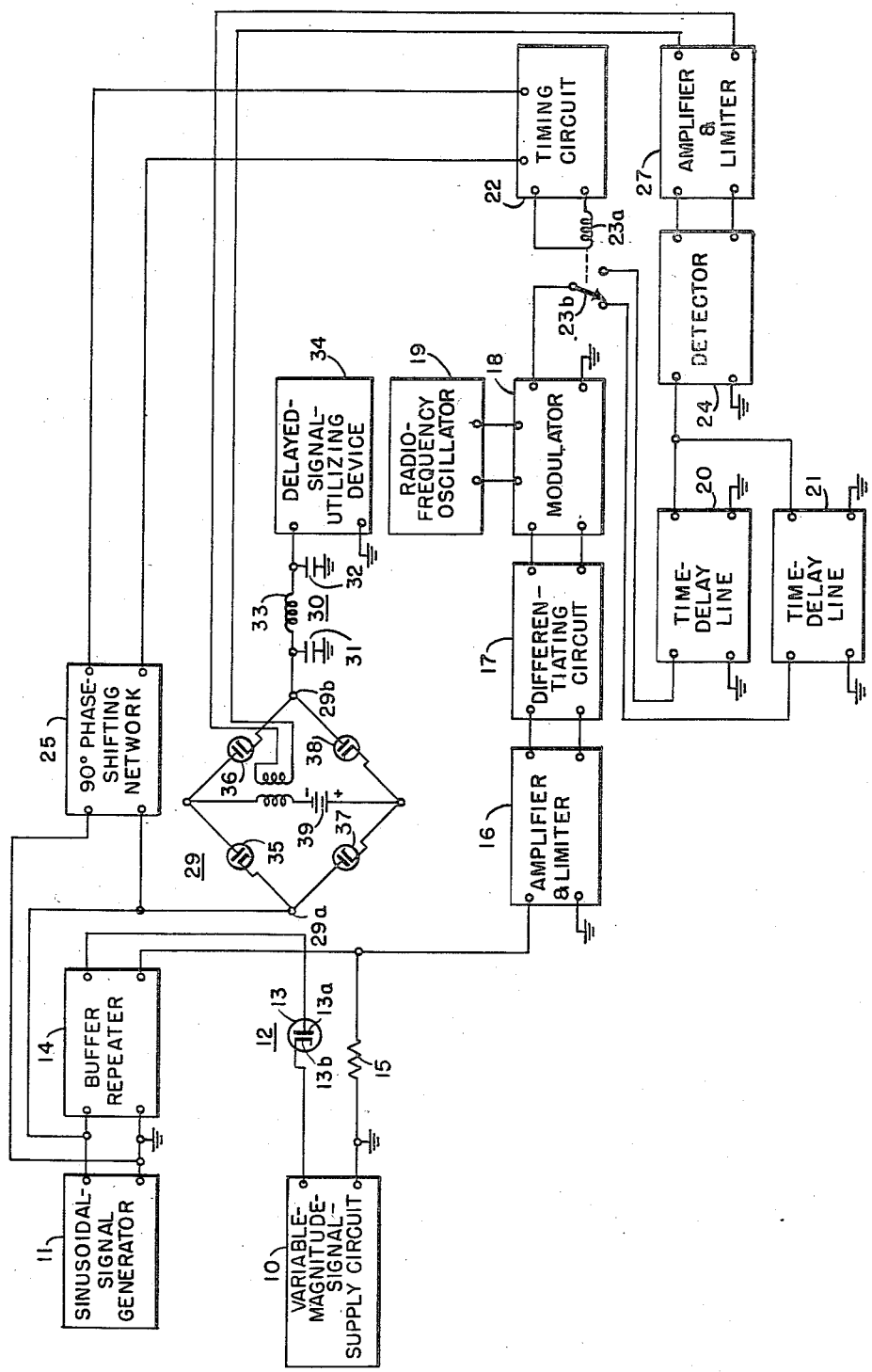

March 18, 1958  C. J. HIRSCH  2,827,564
TIME DELAY SIGNAL-REPEATER SYSTEM
Filed July 28, 1953  2 Sheets-Sheet 1

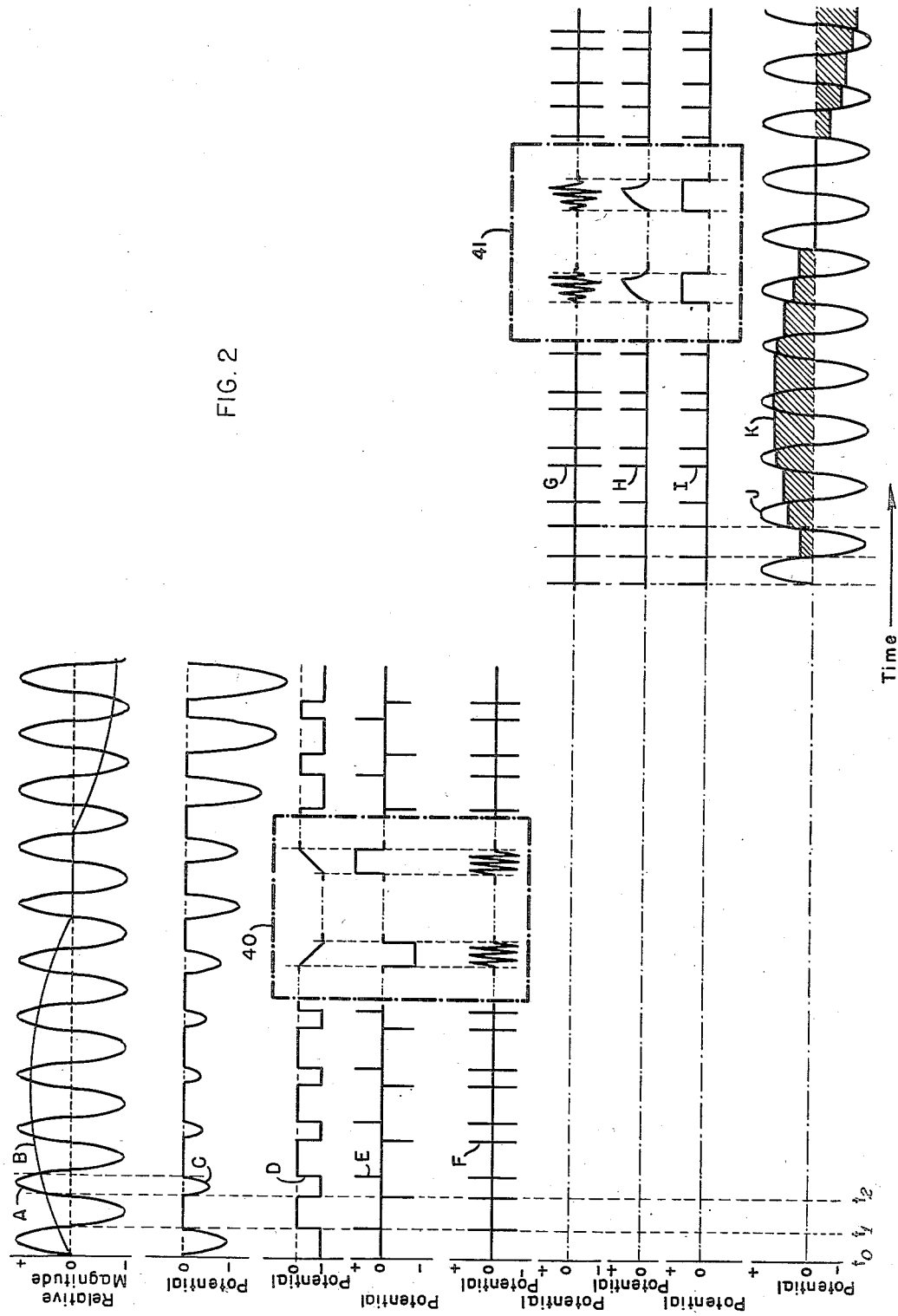

United States Patent Office 2,827,564
Patented Mar. 18, 1958

2,827,564

TIME-DELAY SIGNAL-REPEATER SYSTEM

Charles J. Hirsch, Douglaston, N. Y., assignor to Hazeltine Research, Inc., Chicago, Ill., a corporation of Illinois Application July 28, 1953, Serial No. 370,749

10 Claims. (Cl. 250—27)

*General*

This invention relates to time-delay signal-repeater systems for signals of variable magnitude.

Time-delay signal-repeater systems have particular utility in moving-target indicators which display indications of moving targets to the fairly complete exclusion of stationary targets. Some moving-target indicators provide desired displays by utilizing cancellation circuits which cause cancellation of pulses representative of stationary targets during successive repetition periods while pulses representative of moving targets during successive repetition periods develop resultant pulses for display. To effect cancellation of pulses representative of stationary targets during successive repetition periods, the pulses derived during a first repetition period may be delayed for an interval of one repetition period and then subtracted from pulses derived during the following repetition period.

It has heretofore been proposed to provide desired time delays of variable-magnitude signals, such as pulses representative of targets, by means of time-delay lines of conventional construction. Many types of time-delay lines, however, do not faithfully reproduce signals of variable magnitude translated thereby because of, for example, signal reflections from the boundaries of the time-delay lines, pass-band limitations, and signal reflections within the time-delay lines caused by inhomogeneity of some time-delay wave-propagating materials.

It is an object of the present invention, therefore, to provide a new and improved time-delay signal-repeater system for signals of variable magnitude which avoids one or more of the above-mentioned disadvantages and limitations of such systems heretofore proposed.

It is another object of the invention to provide a new and improved time-delay signal-repeater system for signals of variable magnitude which faithfully reproduces variable-magnitude signals translated thereby.

In accordance with a particular form of the invention, a time-delay signal-repeater system for signals of variable magnitude comprises circuit means for supplying a variable-magnitude signal and circuit means for supplying a periodic signal. The system also includes circuit means coupled to the aforementioned supply circuit means for developing at times determined by the relative magnitudes of the variable-magnitude and periodic signals pulses time-modulated in accordance with the magnitude variations of the variable-magnitude signal. The signal-repeater system also includes time-delay pulse-translating circuit means coupled to the pulse-developing circuit means for translating the aforesaid time-modulated pulses with a predetermined time-delay interval during translation. The signal-repeater system also includes circuit means coupled to the time-delay circuit means and to the periodic-signal-supply circuit means for deriving at times determined by the aforesaid delayed time-modulated pulses periodic-signal samples representative of the variable-magnitude signal delayed by the aforesaid predetermined interval.

For a better understanding of the present invention, together with other and further objects thereof, reference is had to the following description taken in connection with the accompanying drawings, and its scope will be pointed out in the appended claims.

Referring to the drawings:

Fig. 1 is a circuit diagram, partly schematic, representing a time-delay signal-repeater system embodying the present invention, and Fig. 2 is a graph representing various signals developed by the signal-repeater system.

*Description of signal-repeater system*

Referring now more particularly to Fig. 1 of the drawings, a time-delay signal-repeater system for signals of variable magnitude, constructed in accordance with the invention, comprises circuit means 10 for supplying a variable-magnitude signal. The supply circuit 10 may, for example, be the receiver unit of a moving-target indicator for supplying video-frequency pulses which represent moving or stationary targets.

The signal-repeater system also includes circuit means for supplying one or more like periodic signals comprising, for example, a sinusoidal-signal generator 11 of conventional construction for developing a sinusoidal signal preferably having a peak-to-peak amplitude greater than the magnitude variations of the variable-magnitude signal supplied by the circuit 10 and having a repetition frequency of, for example, 2 megacycles and preferably at least double the highest frequency component of the variable-magnitude signal.

There is also provided circuit means coupled to the supply circuits 10 and 11 for developing at times determined by the relative magnitudes of the variable magnitude and periodic signals pulses time-modulated in accordance with the magnitude variations of the variable-magnitude signal. More particularly, this circuit means comprises signal-comparing circuit means 12 for deriving time-modulated first pulses from the periodic signal supplied by the generator 11 at times when the variable-magnitude and periodic signals have substantially equal magnitudes. The signal-comparing circuit means 12 includes a diode 13 having its anode 13a coupled to the generator 11 through a buffer repeater 14 of conventional construction and which may, for example, have unity gain. Cathode 13b of the diode 13 is connected to the variable-magnitude signal-supply circuit 10. The signal-comparing circuit means 12 also includes an output-signal resistor 15 coupled between the variable-magnitude signal-supply circuit 10 and circuit means including an amplifier and limiter 16 of conventional construction for developing time-modulated second pulses representative of the time-modulated first pulses mentioned above.

The amplifier and limiter 16 is coupled through a differentiating circuit 17 of a conventional type to one input circuit of a modulator 18 also of conventional construction and responsive to positive and negative modulating pulses applied thereto. A radio-frequency oscillator 19 having an operating frequency of, for example, 50 megacycles is connected to another input circuit of the modulator 18 for developing in the output circuit of the modulator the aforementioned second pulses or bursts of radio-frequency energy.

The signal-repeater system also includes time-delay pulse-translating circuit means comprising, for example, a pair of time-delay lines 20 and 21 preferably having substantially equal time-delay characteristics for translating the time-modulated pulses, ordinarily subject to amplitude degradation, with a predetermined time-delay interval during translation which preferably is substantially equal to an integral multiple of one-half the period of the periodic signal supplied by the generator 11.

There is also provided circuit means including a timing circuit 22 of a conventional type having a relay winding 23a coupled thereto for operating a relay switch element 23b alternately to couple individual ones of the time-delay lines 20 and 21 to the pulse-developing circuit means comprising the units 16–19, inclusive. The timing circuit 22 is coupled to the generator 11 through a 90° phase-shifting network 25 of a usual type for synchronizing purposes, more fully explained hereinafter.

The signal-repeater system preferably also includes a detector 24 coupled to the time-delay circuit means 20, 21 for deriving the modulation components of the pulses applied thereto by time-delay lines 20 and 21. The detector 24 is coupled to an amplifier and limiter 27 of conventional construction for amplification and amplitude-limiting purposes.

There is also coupled to the time-delay circuit means 20, 21 and to the periodic signal-supply circuit 11 circuit means for deriving at times determined by the delayed time-modulated pulses periodic-signal samples representative of the variable-magnitude signal delayed by the above-mentioned predetermined interval. More particularly, this circuit means comprises a normally open switch-circuit means, for example, a normally nonconductive diode-bridge network 29 which is closed at times determined by the delayed modulated pulses. The arms of the bridge network include tubes 35–38, inclusive, normally biased to cutoff by a source of potential, such as battery 39, included in a diagonal branch of the network 29. The amplifier and limiter 27 is coupled to the diagonal branch of the bridge network for supplying delayed time-modulated pulses to render the bridge network conductive at times determined thereby.

An input terminal 29a of the bridge network 29 is coupled to the output circuit of the generator 11 and an output terminal 29b is coupled to a low-pass filter network 30 for opening and closing the circuit connection between the generator 11 and the network 30. The network 30 preferably has a cutoff frequency between the highest frequency component of the variable-magnitude signal and the repetition frequency of the periodic signal supplied by the generator 11 for attenuating frequency components of the periodic-signal samples above the cutoff frequency faithfully to repeat the variable-magnitude signal. In particular, the low-pass filter network 30 comprises shunt condensers 31 and 32 and a series inductor 33 coupled to the input circuit of a delayed signal-utilizing device 34 which may, for example, be the plan-position indicator unit of a moving-target indicator.

The units represented schematically may individually be of conventional construction and operation and a detailed explanation of the individual internal operations thereof is deemed unnecessary herein.

*Operation of signal-repeater system*

Considering now the operation of the Fig. 1 repeater system with reference to Fig. 2, the generator 11 supplies a continuous sinusoidal signal which is repeated by the buffer repeater 14 and applied to the signal-comparing means 12. Curve A of Fig. 2 represents the output signal of the repeater 14 at the terminal thereof connected to the anode 13a of the diode 13 relative to the terminal connected to the resistor 15.

The variable-magnitude signal-supply circuit 10 supplies at the terminal thereof connected to the cathode 13b of the diode 13 relative to the terminal connected to the resistor 15 a signal represented, for example, by curve B and comprising video-frequency pulses representing targets. During intervals such as $t_0-t_1$ when the sinusoidal signal represented by curve A has a more positive magnitude than the variable-magnitude signal represented by curve B, the diode 13 is rendered conductive and current flows through the diode, the output circuit of the unit 10, and the resistor 15 to the output circuit of the repeater 14. Accordingly, pulses of negative polarity, as represented by curve C, are developed across the resistor 15 during the intervals just mentioned when the diode 13 conducts. During the intervening intervals, such as $t_1-t_2$, when the magnitude of the signal represented by curve B is less positive than the magnitude of the signal represented by curve A, the diode 13 is nonconductive and no pulses are developed across the resistor 15. Since the pulses developed across the resistor 15 and represented by curve C occur during intervals when the diode 13 conducts, the pulses are individually initiated and terminated at times when the sinusoidal and variable-magnitude signals have substantially equal magnitudes.

The pulses developed across the resistor 15 are applied to the amplifier and limiter 16 which, by amplification and amplitude-limiting, derives pulses represented by curve D, individually commencing and terminating at times when the sinusoidal signal represented by curve A and the variable-magnitude signal represented by curve B have equal magnitudes. A section of curve D within a broken-line rectangle 40 is drawn to an expanded time scale to represent the slope of the leading and trailing edges of the pulses of curve D. Broken-line construction of the portions of curve D and other curves within the rectangle 40 indicates that time intervals corresponding thereto have not been represented in their entirety. The time duration of the edges of the pulses of curve D preferably is insignificant relative to the period of the sinusoidal signal represented by curve A, as indicated by the portion of curve D outside of the rectangle 40 and drawn to the same time scale as curve A. For example, the duration of the edges of curve D may be short compared with a period of 0.5 microsecond of the sinusoidal signal of curve A.

The pulses represented by curve D are applied by the unit 16 to the differentiating circuit 17 which derives negative and positive pulses, represented by curve E, from the leading and trailing edges, respectively, of the pulses represented by curve D. Thus, the derived positive and negative pulses occur at times when the sinusoidal and variable-magnitude signals represented by curves A and B, respectively, have substantially equal magnitudes. The derived positive and negative pulses represented by curve E are, therefore, time-modulated in accordance with magnitude variations of the variable-magnitude signal represented by curve B. A section of curve E within the rectangle 40 is drawn to the same expanded time scale as the corresponding section of curve D.

The pulses derived by the differentiating circuit 17 are applied to the modulator 18 while a radio-frequency signal is applied thereto by the oscillator 19 to develop in the output circuit of the modulator pulses or bursts of radio-frequency energy represented by curve F and occurring during the intervals of the pulses represented by curve E and, thus, time-modulated in accordance with the magnitude variations of the variable-magnitude signal represented by curve B. Two pulses of radio-frequency energy represented by curve F are drawn to expanded time scale within the rectangle 40 for clarity.

The modulator 18 applies the pulses of radio-frequency energy represented by curve F to alternate ones of the time-delay lines 20 and 21 under the control of the relay switch element 23b, as will be more fully explained subsequently. The time-delay lines 20 and 21 translate the pulses applied thereto with a predetermined time-delay interval during translation equal, for example, to 2,000 periods of the sinusoidal signal supplied by the generator 11 to provide a time delay of, for example 1,000 microseconds. The time-delay lines 20 and 21 ordinarily cause amplitude degradation of the translated pulses due to, for example, any of the factors previously mentioned as delay-line limitations. Hence the output pulses of the delay lines 20 and 21, represented by curve G, may, for example, be degraded as indicated by the expanded portion of curve G within a broken-line rectangle 41. Broken-line construction of portions of the curves within rectangle 41 indicates that the time intervals corresponding thereto are not represented in their entirety.

The time-delay lines 20 and 21 apply the delayed time-modulated radio-frequency pulses to the detector 24 which derives the modulation components thereof, as represented by curve H of Fig. 2. A porton of curve H enclosed within the rectangle 41 and drawn to the same expanded time scale as the corresponding portion of curve G represents the derived modulation components in detail. The pulses represented by curve H are applied by the detector 24 to the amplifier and limiter 27 which, by usual operations of amplification and amplitude-limiting, develops substantially rectangular amplitude characteristics for the individual delayed time-modulated pulses, as represented by the portion of curve I drawn to expanded time scale within the rectangle 41.

The amplifier and limiter 27 supplies the pulses represented by curve I to the diode-bridge network 29, overcoming the bias supplied by the battery 39 and rendering the bridge network conductive during the intervals of the pulses. The sinusoidal-signal generator 11 also applies to the bridge network 29 the sinusoidal output signal thereof represented by curve J of Fig. 2. When the bridge network is conductive, current flows through the condenser 31 and the bridge network to the output circuit of the generator 11, charging the condenser 31 to the instantaneous magnitude value of the output signal of the generator 11. When the condenser 31 acquires a positive incremental charge, current flows through diodes 36 and 37 and when the condenser acquires a negative incremental charge, current flows through diodes 35 and 38.

During the intervals between pulses represented by curve I, the condenser 31 maintains a substantially constant charge thereon until the next conductive interval of the bridge network 29. Accordingly, there is developed across the condenser 31 a signal represented by curve K which is representative of the variable-magnitude signal supplied by the circuit 10 and represented by curve B. The signal represented by curve K is delayed from the signal represented by curve B by a predetermined interval in accordance with the time-delay characteristic of the time-delay lines 20 and 21. The low-pass filter network 30 is effective to derive for application to the delayed signal-utilizing device 34 a signal which is a more faithful reproduction of the variable-magnitude signal represented by curve B by attenuating in a conventional manner the high-frequency components of the signal represented by curve K above the cutoff frequency of the filter network.

Returning now to a further consideration of the switching operation of the relay switch element 23b accomplished by the timing circuit 22, the operation of the timing circuit is synchronized with the operation of the sinusoidal-signal generator 11 by the application of the sinusoidal output signal thereof to the timing circuit through the 90° phase-shifting network 25. Because of the 90° phase shift in the signal applied to the timing circuit 22, the timing circuit maintains the relay 23a in an energized condition during peak-to-peak magnitude excursions of one sense of the sinusoidal signal developed by the generator 11 and maintains the relay winding 23a in a de-energized condition during peak-to-peak magnitude excursions of the other sense. Accordingly, the relay switch element 23b is in one position during the occurrence of bursts of radio-frequency energy corresponding to the positive pulses of curve E and is in a second position during the occurrence of bursts of radio-frequency energy corresponding to the negative pulses represented by curve E. Alternate connection of the delay lines 20 and 21 to the modulator 18 is useful in applications where the pulse-repetition frequency is so high that a single delay line is incapable of translating all the output pulses of the modulator 18. For some applications, however, a single time-delay line will be capable of translating all the output pulses of the modulator 18 and, of course, time-delay line 20 or 21, the units 22, 25, the relay winding 23a and switch element 23b may then be eliminated and the modulator 18 may be directly connected to the remaining time-delay line.

From the foregoing description, it will be apparent that a time-delay signal-repeater system constructed in accordance with the invention has the advantage of faithfully reproducing a variable-magnitude signal translated thereby notwithstanding amplitude degradation caused during translation by one or more time-delay lines employed in the system. This advantage is provided because time-delay lines which may have poor signal-magnitude-translation characteristics are utilized to translate time-modulation information which represents signal-magnitude information and may thereafter be converted to signal-magnitude information delayed by a predetermined interval.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A time-delay signal repeater system for signals of variable magnitude comprising: a circuit for supplying a variable-magnitude signal; a circuit for supplying a sinusoidal signal having a peak-to-peak amplitude greater than the magnitude variations of said variable-magnitude signal and having a frequency at least double the highest frequency component thereof; signal-comparing circuit means coupled to said circuits for deriving from said sinusoidal signal at times when said variable-magnitude and sinusoidal signals have substantially equal magnitudes first pulses time-modulated in accordance with the magnitude variations of said variable-magnitude signal; circuit means coupled to said signal-comparing circuit means for developing time-modulated second pulses representative of said first pulses; a time-delay pulse-translating line coupled to said pulse-developing circuit means for translating said time-modulated second pulses with a predetermined time-delay interval during translation substantially equal to an integral multiple of one-half the period of said sinusoidal signal; and normally open switch circuit means coupled to said time-delay line and to said sinusoidal-signal-supply circuit and closed at times determined by said delayed time-modulated pulses for deriving samples of said sinusoidal signal representative of said variable-magnitude signal delayed by said predetermined interval.

2. A time-delay signal-repeater system for signals of variable magnitude comprising: circuit means for supplying a variable-magnitude signal; circuit means for supplying one or more like periodic signals; circuit means coupled to said supply-circuit means for developing at times determined by the relative magnitudes of said variable-magnitude and periodic signals pulses time-modulated in accordance with the magnitude variations of said variable-magnitude signal; time-delay pulse-translating circuit means coupled to said pulse-developing circuit means for translating said time-modulated pulses with a predetermined time-delay interval during translation; and circuit means coupled to said time-delay circuit means and to said periodic-signal-supply circuit means for deriving at times determined by said delayed time-modulated pulses periodic-signal samples representative of said variable-magnitude signal delayed by said predetermined interval.

3. A time-delay signal-repeater system for signals of variable magnitude comprising: a circuit for supplying a variable-magnitude signal; a circuit for supplying a periodic signal; circuit means coupled to said circuits for developing at times determined by the relative magnitudes of said variable-magnitude and periodic signals pulses time-modulated in accordance with the magnitude variations of said variable-magnitude signal; time-delay pulse-translating circuit means coupled to said pulse-developing circuit means for translating said time-modulated pulses with a predetermined time-delay interval during translation; and circuit means coupled to said time-delay circuit means and to said periodic-signal-supply circuit for deriving at times determined by said delayed time-modulated pulses samples of said periodic signal representative of said variable-magnitude signal delayed by said predetermined interval.

4. A time-delay signal-repeater system for signals of variable magnitude comprising: a circuit for supplying a variable-magnitude signal; a circuit for supplying a sinusoidal signal having a peak-to-peak amplitude greater than the magnitude variations of said variable-magnitude signal; circuit means coupled to said circuits for developing at times determined by the relative magnitudes of said variable-magnitude and sinusoidal signals pulses time-modulated in accordance with the magnitude variations of said variable-magnitude signal; time-delay pulse-translating circuit means coupled to said pulse-developing circuit means for translating said time-modulated pulses with a predetermined time-delay interval during translation; and circuit means coupled to said time-delay circuit means and to said sinusoidal-signal-supply circuit for deriving at times determined by said delayed time-modulated pulses samples of said sinusoidal signal representative of said variable-magnitude signal delayed by said predetermined interval.

5. A time-delay signal-repeater system for signals of variable magnitude comprising: a circuit for supplying a variable-magnitude signal; a circuit for supplying a sinusoidal signal having a frequency at least double the highest frequency component of said variable-magnitude signal; circuit means coupled to said circuits for developing at times determined by the relative magnitudes of said variable-magnitude and sinusoidal signals pulses time-modulated in accordance with the magnitude variations of said variable-magnitude signal; time-delay pulse-translating circuit means coupled to said pulse-developing circuit means for translating said time-modulated pulses with a predetermined time-delay interval during translation; and circuit means coupled to said time-delay circuit means and to said sinusoidal-signal-supply circuit for deriving at times determined by said delayed time-modulated pulses samples of said sinusoidal signal representative of said variable-magnitude signal delayed by said predetermined interval.

6. A time-delay signal-repeater system for signals of variable magnitude comprising: a circuit for supplying a variable-magnitude signal; a circuit for supplying a periodic signal; signal-comparing circuit means coupled to said circuits for deriving from said periodic signal at times when said variable-magnitude and periodic signals have substantially equal magnitudes first pulses time-modulated in accordance with the magnitude variations of said variable-magnitude signal; circuit means coupled to said signal-comparing circuit means for developing time-modulated second pulses representative of said first pulses; time-delay pulse-translating circuit means coupled to said pulse-developing circuit means for translating said time-modulated second pulses with a predetermined time-delay interval during translation; and circuit means coupled to said time-delay circuit means and to said periodic-signal-supply circuit for deriving at times determined by said delayed time-modulated pulses samples of said periodic signal representative of said variable-magnitude signal delayed by said predetermined interval.

7. A time-delay signal-repeater system for signals of variable magnitude comprising: a circuit for supplying a variable-magnitude signal; a circuit for supplying a periodic signal; circuit means coupled to said circuits for developing at times determined by the relative magnitudes of said variable-magnitude and periodic signals pulses time-modulated in accordance with the magnitude variations of said variable-magnitude signal; a time-delay pulse-translating line coupled to said pulse-developing circuit means for translating said time-modulated pulses with a predetermined time-delay interval during translation substantially equal to an integral multiple of one-half the period of said periodic signal; and circuit means coupled to said time-delay circuit means and to said periodic-signal-supply circuit for deriving at times determined by said delayed time-modulated pulses samples of said periodic signal representative of said variable-magnitude signal delayed by said predetermined interval.

8. A time-delay signal-repeater system for signals of variable magnitude comprising: a circuit for supplying a variable-magnitude signal; a circuit for supplying a periodic signal; circuit means coupled to said circuits for developing at times determined by the relative magnitudes of said variable-magnitude and periodic signals pulses time-modulated in accordance with the magnitude variations of said variable-magnitude signal; a pair of time-delay pulse-translating circuit means having substantially equal time-delay characteristics for translating said time-modulated pulses with a predetermined time-delay interval during translation; switch-circuit means coupled to said periodic signal-supply circuit and operatively synchronized therewith for alternately coupling individual ones of said pair of time-delay circuit means to said pulse-developing circuit means; and circuit means coupled to said time-delay circuit means and to said periodic-signal-supply circuit for deriving at times determined by said delayed time-modulated pulses samples of said periodic signal representative of said variable-magnitude signal delayed by said predetermined interval.

9. A time-delay signal-repeater system for signals of variable magnitude comprising: a circuit for supplying a variable-magnitude signal; a circuit for supplying a periodic signal; circuit means coupled to said circuits for developing at times determined by the relative magnitudes of said variable-magnitude and periodic signals pulses time-modulated in accordance with the magnitude variations of said variable-magnitude signal; time-delay pulse-translating circuit means coupled to said pulse-developing circuit means for translating said time-modulated pulses with a predetermined time-delay interval during translation; and normally open switch-circuit means coupled to said time-delay circuit means and to said periodic-signal-supply circuit and closed at times determined by said delayed time-modulated pulses for deriving samples of said periodic signal representative of said variable-magnitude signal delayed by said predetermined interval.

10. A time-delay signal-repeater system for signals of variable magnitude comprising: a circuit for supplying a variable-magnitude signal; a circuit for supplying a periodic signal having a repetition frequency at least double the highest frequency component of said variable-magnitude signal; circuit means coupled to said circuits for developing at times determined by the relative magnitudes of said variable-magnitude and periodic signals pulses time-modulated in accordance with the magnitude variations of said variable-magnitude signal; time-delay pulse-translating circuit means coupled to said pulse-developing circuit means for translating said time-modulated pulses with a predetermined time-delay interval during translation; circuit means coupled to said time-delay circuit means and to said periodic-signal-supply circuit for deriving at times determined by said delayed time-modulated pulses samples of said periodic signal representative of said variable-magnitude signal delayed by said predetermined interval; and a low-pass filter network coupled to said signal-sample-deriving circuit means and having a cutoff frequency between said highest frequency component of said variable-magnitude signal and said repetition frequency of said periodic signal for attenuating frequency components of said samples above said cutoff frequency faithfully to repeat said variable-magnitude signal.

References Cited in the file of this patent

UNITED STATES PATENTS

| | | |
|---|---|---|
| 2,405,876 | Crosby | Aug. 13, 1946 |
| 2,542,700 | Peterson | Feb. 20, 1951 |
| 2,557,950 | Deloraine | June 26, 1951 |
| 2,638,572 | Goubau | May 12, 1953 |
| 2,666,136 | Carpenter | Jan. 12, 1954 |
| 2,678,388 | Loughlin | May 11, 1954 |
| 2,686,869 | Bedford | Aug. 17, 1954 |